Oct. 29, 1963    M. G. DE FRIES ETAL    3,108,433
ROCKET MOTOR AND SOLID PROPELLENT GRAIN WITH
WOVEN POLYMERIC INHIBITOR COATING
Filed March 4, 1960    2 Sheets-Sheet 1
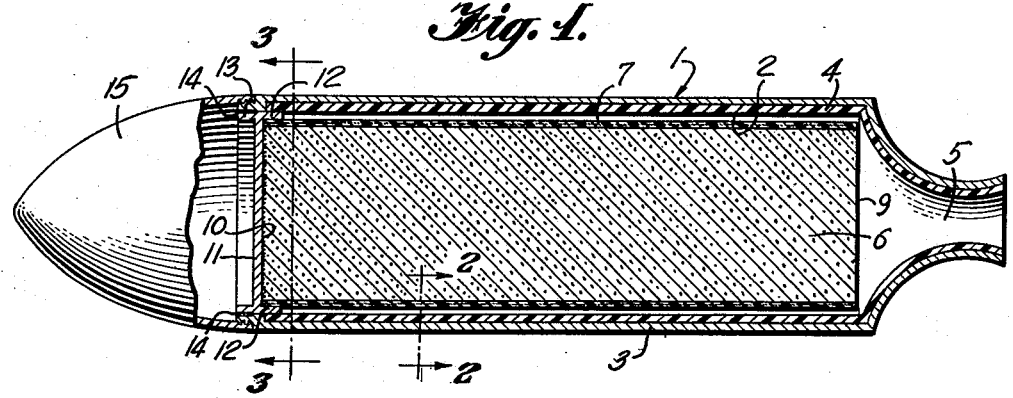
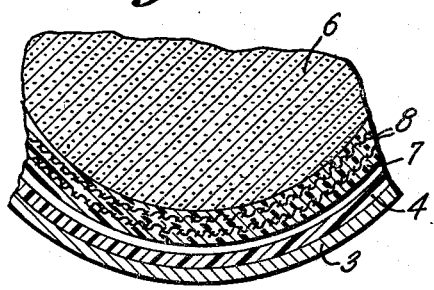
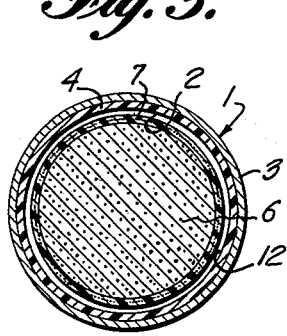
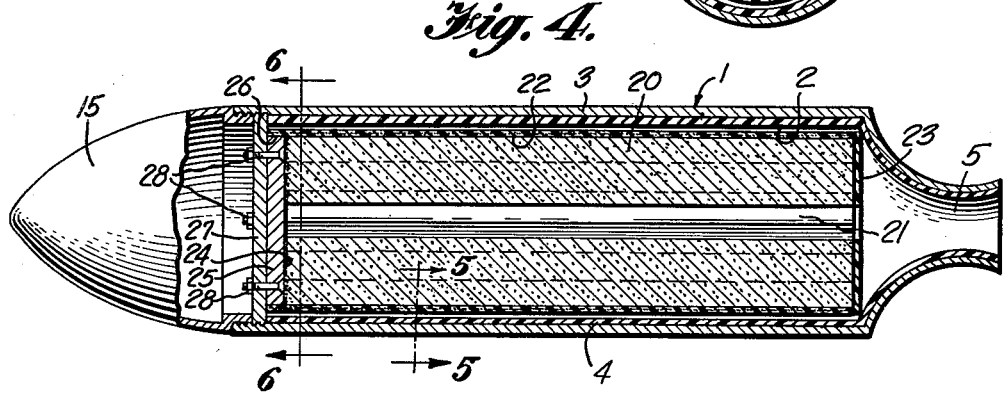
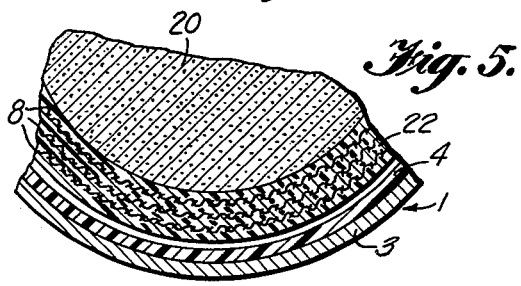
INVENTORS
Myron G. DeFries,
Bruno J. Macri,
Alvist V. Rice,
Courtland N. Robinson *and*
BY    Dale A. Madden
*Martha L. Ross*
AGENT

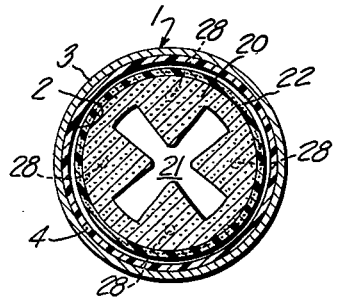
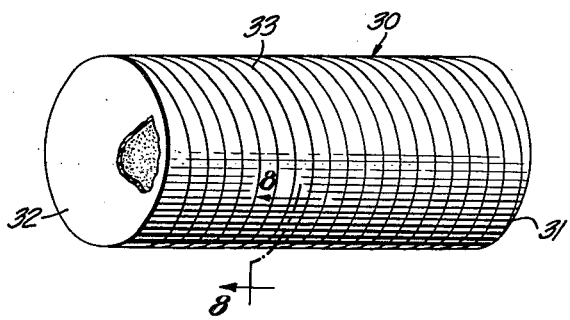
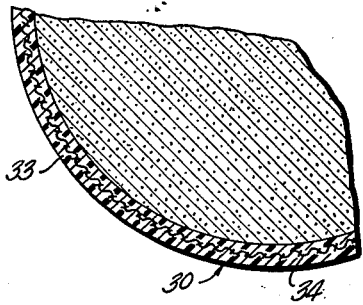
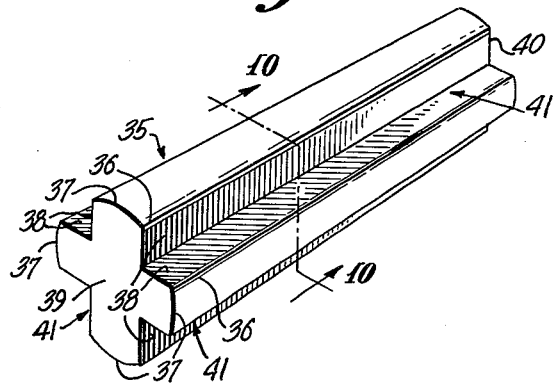
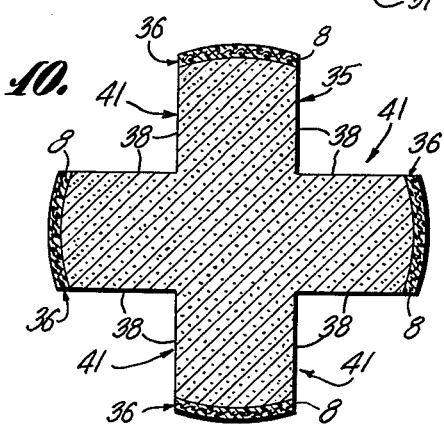
INVENTORS
Myron G. DeFries,
Bruno J. Macri,
Alvist V. Rice,
Courtland N. Robinson and
Dale A. Madden
BY Martha L. Ross
AGENT

United States Patent Office 3,108,433
Patented Oct. 29, 1963

3,108,433
ROCKET MOTOR AND SOLID PROPELLENT GRAIN WITH WOVEN POLYMERIC INHIBITOR COATING
Myron G. De Fries, Bethesda, Md., Bruno John Macri, Washington, D.C., Alvist V. Rice and Dale A. Madden, Alexandria, Va., and Courtland N. Robinson, Washington, D.C., assignors to Atlantic Research Corporation, Fairfax County, Va., a corporation of Virginia
Filed Mar. 4, 1960, Ser. No. 12,870
18 Claims. (Cl. 60—35.6)

This invention relates to new and improved, surface-inhibited, solid propellant grains.

The use of solid propellant grains to produce propulsive gases, as, for example to produce thrust in a reaction motor, is well known. Such grains are made of compositions which are self-contained with respect to their oxygen requirements for combustion, are cast or molded into a suitable size and shape, and inserted into the combustion chamber of the reaction motor. The grains are generally elongated cylindrical bodies. They can be designed as end-burning grains, which burn from one end; as internally-burning grains by means of a longitudinal perforation, which provides an internal burning surface; or as externally burning grains, which burn from the outside lateral surface toward the center of the grain along burning surfaces provided by longitudinal, uninhibited recesses in the side wall of the grain. One of the important parameters in determining the mass rate of gas generation of such grains is the area of burning surface. Control of burning surface area can be obtained by the well-known expedient of restricting burning of the grain to a predetermined surface or surfaces. This can be accomplished by preventing the ignition of other of the grain surfaces by means of an inhibitor coating. Such coatings do not ignite because they generally are polymeric materials, such as cellulose acetate or ethyl cellulose, formulated without oxygen available for combustion of the coating.

The positioning of the inhibitor coating is determined by grain design and the desired mode of burning. In the case of cylindrical end-burning or internally-burning grains, the inhibitor coats the entire lateral, exterior, cylindrical surface of the grain. In some instances, as in the case of a cruciform-shaped grain, only the most peripheral lateral surfaces of the grain are inhibited.

The inhibitor coating must adhere continuously and tenaciously to the grain since any break in the bond might result in ignition at that point and a disastrous increase in the rate of gas generation and pressure in the motor. The coating must, therefore, be able to expand and contract with the grain as the latter responds to changes in ambient temperature, since otherwise the bond between the grain and coating might rupture. The thermoplastic coatings presently in use are satisfactory at a normal range of ambient temperatures, but serious problems arise if the inhibited propellant grains are exposed to extremes of temperature as, for example in frigid areas or when subjected to aerodynamic heating or maintained in the proximity of heated objects. At temperatures below about −10° to −20° F., the coatings lose elasticity, and become brittle to the point where they crack or fissure, with resultant failure of the grain. At elevated temperatures, they tend to become excessively soft with resultant loss of strength. Coatings with improved high temperature properties often tend also to have higher embrittlement temperatures. None of the conventional coatings have proven entirely satisfactory at temperatures substantially below about −10° F.

The object of this invention is to provide inhibitor coatings for solid propellant grains which perform successfully at substantially all environmental temperatures to which the grain may be subjected, from frigid to elevated temperatures.

Another object is to provide inhibitor coatings for solid propellent grains of such great strength as to provide a protective support for the grain when under stress.

Other objects and advantages will become evident from the following detailed description and the drawings.

In the drawings, in which like parts are indicated by the same numerals:

FIGURE 1 is a longitudinal section showing an inhibited end-burning grain according to our invention mounted in a rocket motor.

FIGURE 2 is an enlarged fragmentary view in cross-section taken on lines 2—2 of FIGURE 1.

FIGURE 3 is a cross-section along lines 3—3 of FIGURE 1.

FIGURE 4 is a longitudinal section of a modification showing an inhibited, internally-burning grain mounted in a rocket motor.

FIGURE 5 is an enlarged fragmentary view in cross-section taken on lines 5—5 of FIGURE 4.

FIGURE 6 is a cross-section along lines 6—6 of FIGURE 4.

FIGURE 7 is a perspective view of an end-burning propellant grain showing a modified inhibitor coating.

FIGURE 8 is an enlarged fragmentary cross-sectional view taken in lines 8—8 of FIGURE 7.

FIGURE 9 is a perspective view of a cruciform-shaped grain inhibited according to our invention.

FIGURE 10 is a cross-section along lines 10—10 of FIGURE 9.

Broadly speaking, our invention comprises applying liquid epoxy polymer to the solid propellant grain surfaces to be inhibited, and curing the epoxy polymer to a solid coating with the aid of a curing agent. The epoxy resin coating after setting, adheres to the propellant grain surface in a tenacious bond which is generally stronger than the propellant grain itself. This is an important advantage, since it eliminates many of the prior art requirements involving the separate preparation of inhibitor coating strips, as for example in the case of cellulose acetate or ethyl cellulose, and subsequent adhesive bonding of the inhibitor to the grain.

The epoxy resin inhibitor can be employed with a solid propellant grain of any composition and is particularly effective for use on a propellant grain comprising an organic polymer component. The organic polymer can be self-sufficient with regard to its oxygen requirement, namely contain oxygen available for combustion of other components of the molecule, such as the nitrocellulose in a double-base type grain, or it can be an organic polymer which functions as a binder and fuel in a composite type propellent containing, in addition, oxidizer components, such as inorganic oxidizer salts, metal peroxides, and the like. Examples of such polymeric fuels and binders include the vinyl polymers, such as polyvinyl chloride and polyvinyl acetate, alkyd and polyester resins, organic polysulfides, cellulose esters, such as cellulose acetate, polyurethanes, polybutadiene-acrylonitrile, and the like. The oxidizer can be any active oxidizing agent such as the ammonium or alkali metal, e.g. Na, K, or Li, perchlorates or nitrates, and metal peroxides, such as barium peroxide.

The epoxy resin coatings are characterized by coefficients of thermal expansion which closely approximate those of the organic polymer based solid propellant grains, including such grains containing large proportions of finely divided solid, inorganic oxidizers, such as ammonium perchlorate, so that the coatings temperature-cycle with the grains without rupturing or fissuring. Close adjustment of expansion properties to that of a particular grain can be readily achieved by suitable formulation of the epoxy polymer composition, choice of curing catalyst, and curing times and temperatures.

The epoxy resin coatings, furthermore, retain sufficient tensile strength and elasticity at temperatures as low as −65° F. and less to perform their inhibitor function without the failure that has hitherto been encountered with other types of inhibitors. The thermosetting plastic coating also has excellent high-temperature properties since it does not soften or lose its intrinsic strength to any substantial extent at temperatures as high as 175° F. or above. The epoxy resin thus forms a coating on the propellent grain which successfully performs its inhibitor function throughout the broadest spectrum of environmental temperature conditions which might be encountered.

The liquid epoxy resin is preferably an aromatic epoxy, such as the reaction product of bisphenol A, $$HOC_6H_4C(CH_3)_2C_6H_4OH$$

bisphenol F, $HOC_6H_4CH_2C_6H_4OH$; tetrachloro-bisphenol A; diphenolic acid, $(HOC_6H_4)_2(CH_3)CCH_2CH_2COOH$; cashew phenol, $$HOC_6H_4(CH_2)_7(HOC_6H_4)CH(CH_2)_6CH_3$$

and the like, with epichlorohydrin. It can also be in aliphatic epoxy, such as the condensation product of a polyol, e.g. glycerol, with epichlorohydrin. Reactive monoepoxy diluents, such as allyl glycidyl ether, butyl glycidyl ether, and phenyl glycidyl ether can be introduced into the aromatic liquid epoxides, such as the bisphenol A diepoxide to reduce viscosity.

Any suitable curing agent can be used to set the liquid epoxy into a solid coating, and can be selected with an eye to the particular properties desired in the cured coating, such as toughness, flexibility, softening temperature, and the like. Another factor in the choice of a curing agent lies in the curing temperature required. In many instances it is preferable to employ an agent which produces a cure at ambient temperatures to avoid an additional heating procedure for economic reasons or to minimize the hazardous heat treatment of a sensitive propellent.

Curing and modifying agents for liquid epoxy polymers are well known in the art and include for example, primary, secondary, and tertiary amines, such as ethylene diamine, diethylene triamine, triethylene tetramine, methylene dianiline, m-phenylene diamine, 4,4'-diamino-diphenyl sulfone, and tri-(diamethylaminomethyl)-phenol (DMP-30); liquid polyamides containing reactive amino and carboxyl groups; acid anhydrides, such as phthalic anhydride, hexahydophthalic anhydride, and dodecylsuccinic anhydride; boron trifluoride-amine complexes; liquid organic polysulfides; and the like.

Particularly suitable for our purpose, are the liquid polyamides containing reactive, polar, amine groups. Such reactive, liquid polymers function both as curing agents, because of the reactive amine groups, and as cross-linking, coreactive, modifying agents for the liquid epoxy polymer. The cured epoxy-polyamide compositions possess exceptionally low embrittlement temperatures, and retain good tensile and mechanical strength at temperatures as low as −65° F. and less and as high as 175° F. and higher. Corollary advantages include relatively long pot life and curability at room temperatures.

Illustrative of suitable polyamide curing and modifying agents are the liquid resins made by reacting dimer and trimer vegetable oil acids, such as dimerized linoleic acid, with di- or tri-amines, such as ethylene diamine or diethylene triamine.

The amount of curing agent will, of course, vary with the particular liquid epoxy polymer and curing agent, from as little as 2 or 3 phr. (parts per hundred parts epoxy resin) for highly active catalysts, such as DMP-30, to 100 phr. of a reactive polyamide. The preferred ratios of the liquid epoxy polymer to liquid, reactive-amine-containing polyamide are 50:50 to 70:30.

The liquid epoxy composition can be applied to the surfaces of the propellent grain to be inhibited in any suitable fashion, as by dipping, spraying, or brush application, and then cured at room or elevated temperature.

Solid propellent grains encased within the rocket motor are frequently subjected to high accelerative stresses, as, for example, in the case of sustainer motors and in missiles which make sharp, rapid turns when homing on a target. Such high stresses can crack or fissure the propellent grain or even cause it to break away from its forward bonding to the forward wall or head plate of the rocket motor, with resulting obstruction of the nozzle.

We have discovered that the epoxy inhibitor coating can provide an exceedingly strong, light weight, rigid structural support for the propellent grain when it is reinforced with one or more layers of a porous sheet, made of an organic polymeric material, in such manner that the porous sheet is impregnated with the epoxy resin, so that it is an integral part of the coating. It is essential that the porous sheet be made of organic polymeric material, such as polyamide, e.g. nylon; polyacrylonitrile, e.g. Orlon; polyacrylate or polymethacrylate ester; polyester, such as Dacron; polyethylene; cellulose ester, e.g. cellulose acetate; cellulose ether, e.g. ethyl cellulose; polyvinyl, e.g. polyvinyl chloride, polystyrene; cotton; or rayon, in order that the reinforced epoxy resin coating retain the proper coefficient of thermal expansion necessary for satisfactory temperature cycling with the propellent grain. Inorganic materials such as fiber glass, asbestos, or metal generally have coefficients of thermal expansion which are so much lower than those of the organic polymer based propellent grains, as to cause inhibitor failure if the grains are subjected to marked changes in ambient temperature.

The porous, reinforcing element is preferably in the form of a woven fabric or screening but can be a sheet of the organic polymeric material rendered porous in any suitable manner, as by perforation. It can be applied to the propellent grain surface as an integral part of the epoxy inhibitor coating in a variety of ways. The liquid epoxy composition can be spread on the grain surface and the porous sheet superimposed, while the coating is still fluid, in such manner as to be impregnated with the liquid polymer. Firm pressure should be applied uniformly across the sheet so that the liquid polymer penetrates through the porous sheet to the exterior surface. The expressed polymer can then be brushed or otherwise spread smoothly over the exterior surface of the sheet. Alternatively, the porous sheet can be dipped in the liquid polymer and then applied, with even, firm pressure, to the propellent grain surface.

After curing at room or elevated temperature, the porous sheet becomes an integral part of the epoxy inhibitor coating and increases its tensile strength and resistance to shock severalfold, so that it provides highly effective structural support to the grain with a minimum of increase in dead weight because of the relatively low density of the organic polymer reinforcing material.

The porous sheet can be precut to the size of the grain surface to be covered or it can be applied in the form of a relatively narrow strip or tape, which is wound on to the grain in any desired manner. Structural strength of the applied coating can be increased as desired by pluralizing the number of layers or laminated plies of the porous sheet material, with additional impregnating liquid epoxy polymer being supplied as necessary.

The propellent grain must be anchored in the motor chamber in a stationary position to prevent fracturing of the grain or clogging of the motor nozzle by the grain under set-back forces produced by high forward acceleration of the motor. It is conventional practice to bond the forward end face of the grain to the front wall of the motor chamber, or to a head plate which is secured to the forward closure of the motor. The bonding adhesive functions also as an inhibitor coating to prevent ignition of the front face of the grain. Such bonding is frequently inadequate when the grain is subjected to high accelerative forces, particularly in the case of sustainer rockets.

We have found that if, in addition to such front face bonding, the inhibitor coating containing the reinforcing porous sheeting, preferably in the form of a plurality of layers of woven fabric, not only is applied as a restrictive liner to the lateral cylindrical surface of a cylindrical grain, but also is bonded circumferentially at its forward end to a rearwardly projecting concentric extension of the front motor wall or closure, it functions as a highly effective structural restraining support for the grain. This concentric element can be an annular flange, or a boss, which is an integral part of the front motor closure, or a head plate which is secured to the rear face of the front motor closure in any suitable manner, such as by adhesive bonding, bolting, and the like.

The concentric extension element provided for bonding of the epoxy inhibitor coating can be made of any strong, rigid material such as metal or plastic, e.g. epoxy resin, phenol-formaldehyde resin, or the like. The epoxy resin of the inhibitor coating bonds tenaciously to any such material, as well as to the propellant grain. The reinforced epoxy inhibitor coating, when securely fastened in this manner at the forward end of the motor chamber, functions as a strong supporting and restraining structure for the propellant grain, with the shearing stresses produced by set-back forces evenly distributed over the large area presented by the bond between the coating and the grain.

Referring now to the drawings, FIGURE 1 shows a rocket motor 1 comprising combustion chamber 2 formed by motor casing 3, lined with insulation 4, and provided with restricted nozzle 5 for exit of the thrust-producing, high pressure combustion gases. The end-burning, solid propellant grain 6, seated in the rocket motor, is inhibited against ignition on its lateral cylindrical surface by coating 7 bonded thereto comprising epoxy resin containing integrally disposed therein 2 layers 8 of a porous sheet, such as woven fabric, made of an organic polymeric material, such as nylon, rayon, cotton, Dacron, Orlon, and the like. The rear end face 9 of grain 6 is the uninhibited ignition surface. The forward end face 10 of the grain is adhesively bonded, as for example with epoxy resin, to front motor wall or closure 11, which is provided with a peripheral, rearwardly extending, annular flange 12, forming a cup-shaped element, with the front motor wall as base, in which the propellant grain, with its lateral, reinforced epoxy coating is seated. In addition to the bonding of the forward end face 10 to the front motor wall, the forward end of the reinforced epoxy coating 7 is circumferentially bonded to annular flange 12. This bonding can be accomplished by inserting the coated grain into the rearwardly facing, cup-shaped portion of the front motor closure prior to cure and setting of the liquid epoxy. After the grain has been bonded to the front motor closure 11, it is inserted into the motor casing 3, to which annular forward flange 13 of closure 11 is secured by any suitable means, such as adhesive bonding 14. Payload 15 can then be attached to the motor.

FIGURES 4, 5, and 6 show a modification in which propellant grain 20 is an internally-burning grain which burns outwardly from the uninhibited ignition surface presented by the longitudinal perforation 21 of cruciform cross-section. The lateral cylindrical surface of the grain is inhibited by epoxy coating 22, which is similar to that shown in FIGURE 2 except that it is laminated with 3 layers of fabric. The rear end face of grain 20 is inhibited with a coating of epoxy polymer 23.

The forward end face 24 of the grain is bonded, preferably with epoxy resin, to head plate 25, which in this case is a flat disc of the same diameter as that of the grain without its lateral surface inhibitor coating, so that the head plate provides a base for the entire face of the grain without its lateral inhibitor. The cylindrical inhibitor coating 22 extends forwardly beyond the front face 24 of the grain so that it surrounds and is circumferentially bonded to the circular lateral surface 26 of head plate 25. This can be accomplished by bonding the front end of the propellant grain to the head plate and then applying the reinforced inhibitor coating 22 around both the head plate and the grain. The head plate can be made of a metal, such as aluminum, or of a rigid plastic. The head plate is secured to front motor wall closure 27 in any suitable manner, such as by stud and nut means 28.

FIGURE 7 and 8 show an end-burning grain 30, having initial ignition surface 31, epoxy inhibited end surface 32, and a reinforced lateral epoxy inhibitor coating 33, in which the porous sheet is tape 34, e.g. woven nylon tape, wound around the grain as shown, and impregnated with the liquid epoxy so that it becomes an integral part of the coating after cure. As illustrated, it is laid down to form a single ply, but it can be wound in a plurality of layers. It will also be understood that the tape can be applied in a variety of configurations.

FIGURES 9 and 10 show a cruciform grain 35 inhibited with reinforced epoxy coating 36 on arcuate lateral surfaces 37, and provided with longitudinal, lateral recesses 41, which are uninhibited and, therefore, provide initial ignition surfaces 38. End faces 39 and 40 are, in this instance, inhibited with epoxy resin. The forward ends of the lateral epoxy inhibitor coating, can be bonded circumferentially to a cooperating extension of the front motor closure, substantially as shown in FIGURES 1 and 4.

*Example 1*

Tests were made with a Tinius-Olsen tensile tester on strips made of the following epoxy formulations to determine tensile strength and degree of elongation at a wide range of ambient temperature.

Parts

A. Araldite 502 (the reaction product of bisphenol
 A and epichlorhydrin) _____ 50
 Versamid 125 (polyamide containing reactive
 amine groups) _____ 50
 DMP-30 tri-(dimethylaminomethyl)-phenol ____ 3
B. Araldite 502 _____ 50
 Versamid 125 _____ 50
C. Araldite 502 _____ 60
 Versamid 125 _____ 40
D. Araldite 502 _____ 70
 Versamid 125 _____ 30

The liquid epoxy and polyamide components were mixed together and allowed to cure at room temperature. The strips employed in the tests were 0.1 inch thick and 0.5 inch wide.

|   | −65° F. | | 78° F. | | 165° F. | |
|---|---|---|---|---|---|---|
|   | T.S.,[1] p.s.i. | Elongation, percent | T.S., p.s.i. | Elongation, percent | T.S., p.s.i. | Elongation, percent |
| A | 3,100 | 5 | 2,250 | 78 | 140 | 47 |
| B | 3,300 | 4 | 2,800 | 35 | 150 | 32 |
| C | 2,100 | 4 | 5,000 | 33 | 600 | 48 |
| D | 1,250 | 2.5 | 4,800 | 13 | 340 | 46 |

[1] Tensile strength—load at rupture.

It will be noted that all of the epoxy formulations had exceedingly high tensile strengths at temperatures as low as −65° F. and at ordinary temperatures. At temperatures as high as 165° F., all retained substantial tensile strength, with the 60/40 formulation making an exceptionally strong showing. The appreciable degree of elongation at −65° F. clearly demonstrated the absence of embrittlement. These tests also show that variations in the epoxy formulation can be employed to tailor the epoxy coating to the desired physical characteristics.

Example 2

Formulation C of Example 1 was reinforced with 3 layers of nylon fabric. The layers of fabric were impregnated with the liquid resin formulation and cured to form an integral film.

Strips of the reinforced epoxy were tested as in Example 1 at substantially similar temperatures, with the following results:

|  | −65° F. | 80° F. | 160° F. |
|---|---|---|---|
| T.S., p.s.i. | 9,400 | 9,000 | 6,000 |
| Elongation, percent | 36 | 39 | 52 |

It will be noted that the reinforcing nylon fabric enormously increased tensile strength of the epoxy coating and improved elasticity at low temperatures.

Example 3

End-burning, solid propellent grains 2.52 in. in diameter and 19.5 in. long were made of a propellant composition comprising finely divided ammonium perchlorate and aluminum powder, dispersed in a polyvinyl chloride fuel binder plasticized with dioctyl adipate. The cylindrical surface of each of the grains was inhibited with a coating consisting of 60 parts of Araldite 502 and 40 parts of Versamid 125. One of the coatings was not reinforced. Others were variously reinforced with 1 to 6 plies of nylon fabric. The grains were inserted into rocket motors and static fired at temperatures ranging from −65° F. to 160° F. Some of the grains were temperature cycled 3 times from −65° F. to 160° F. and held for 8 hours at each extreme. Linear coefficient of thermal expansion of the uninhibited grains was about $5.5 \times 10^{-5}$; that of the inhibited grains about $5 \times 10^{-5}$. X-ray examination showed no adverse effect on the grain or inhibitor. The forward face of each of the grains was bonded to the front wall closure of the motor chamber. The epoxy inhibitor coatings of some of the grains were circumferentially bonded forward of the grain to the sides of a one inch thick head plate secured to the front motor wall. All grains burned successfully at all of the temperatures tested, indicating no inhibitor failure. The "X" in the following table summarizing the test results indicates a single firing.

| Number of nylon plies in coating | Temperature | | |
|---|---|---|---|
|  | −65° F. | 78° F. | 160° F. |
| 0 | X* | | |
| 1 | X* | | |
| 2 | X*¹ | | |
| 3 | X*¹ | X* | |
| 4 | X*¹ | | |
| 5 | X*¹ | | |
| 6 | X*¹ | X | X |

*Temperature cycled 3 times from −65° F. to 160° F. and held 8 hours at each extreme. X-ray showed no ill effect.
¹ Nylon-reinforced inhibitor coating circumferentially bonded to head plate.

Example 4

An end-burning grain, 4 in. in diameter and 54 in. long, made of a propellent composition comprising finely divided ammonium perchlorate and aluminum dispersed in polyvinyl chloride plasticized with dioctyl adipate, was coated on its cylindrical surface with a liquid epoxy composition consisting of 60 parts epoxy (Araldite 502) and 40 parts polyamide (Versamid 125) reinforced with 4 layers of nylon fabric. The coated grain was temperature cycled for 8 hours at −10° F. and 16 hours at 110° F. and then X-rayed for flaws. None were found. The grain was inserted into a rocket motor, in which it was bonded to the forward motor wall and fired at 70° F. The firing was successful, showing no inhibitor failure.

Example 5

13 end-burning grains, 13 in. in diameter and 52 in. long, made of a propellent composition comprising finely divided ammonium perchlorate, dispersed in polyvinyl chloride plasticized with dioctyl adipate, were coated with a liquid epoxy composition consisting of 50 parts Araldite 502, 50 parts Versamid 125, and 3 parts DMP-30, reinforced with 6 layers of woven nylon fabric. The coated grains were temperature cycled for 24 hours at −30° F. and 24 hours at 145° F. without failure. The inhibited grains were test fired in rocket motors, 2 at −30° F., 1 at 45° F., and 10 at 78° F. All firings were successful.

Although this invention has been described with reference to illustrative embodiments thereof, it will be apparent to those skilled in the art that the principles of this invention can be embodied in other forms but within the scope of the claims.

We claim:

1. A shaped solid propellent grain comprising a self-oxidant, gas-producing composition, having at least one initial ignition surface, and having at least one surface inhibited against ignition by a solid inhibitor coating bonded thereto, said coating consisting essentially of a cured mixture of a reactive liquid epoxy polymer and a liquid polyamide containing reactive amino groups, containing embedded therein as an integral portion thereof at least one layer of a porous sheet consisting essentially of an organic polymer material, and being of sufficient thickness to provide substantial heat insulation, said organic polymer material being selected from the group consisting of polyamide, polyacrylonitrile, polyacrylate ester, polymethacrylate ester, polyester, polyethylene, cellulose ester, cellulose ether, polyvinyl, cotton, and rayon.

2. The propellent grain of claim 1 in which the epoxy polymer is an aryl derivative.

3. The propellent grain of claim 2 in which the aryl epoxy polymer is the reaction product of bisphenol A and epichlorohydrin.

4. The propellent grain of claim 1 in which the porous sheet is in the form of a woven fabric.

5. The propellent grain of claim 4 in which the woven fabric is a polyamide.

6. The propellent grain of claim 2 in which the porous sheet is in the form of a woven fabric.

7. The propellent grain of claim 6 in which the woven fabric is a polyamide.

8. The propellent grain of claim 3 in which the porous sheet is a woven polyamide fabric.

9. The propellent grain of claim 1 in which the propellent grain is substantially cylindrical in shape and the inhibitor coating is bonded to the exterior cylindrical surface of the grain.

10. The propellent grain of claim 4 in which the propellent grain is substantially cylindrical in shape and the inhibitor coating is bonded to the exterior cylindrical surface of the grain.

11. The propellent grain of claim 5 in which the propellent grain is substantially cylindrical in shape and the inhibitor coating is bonded to the exterior cylindrical surface of the grain.

12. The propellent grain of claim 6 in which the propellent grain is substantially cylindrical in shape and the inhibitor coating is bonded to the exterior cylindrical surface of the grain.

13. The propellent grain of claim 7 in which the propellent grain is substantially cylindrical in shape and the inhibitor coating is bonded to the exterior cylindrical surface of the grain.

14. The propellent grain of claim 8 in which the propellent grain is substantially cylindrical in shape and the inhibitor coating is bonded to the exterior cylindrical surface of the grain.

15. In a rocket motor, comprising a combustion chamber and provided rearwardly with a restricted nozzle, a cylindrical, solid propellent grain, comprising a self-oxidant, gas-producing composition, seated therein, the exterior cylindrical surface of said grain being inhibited against ignition by a solid inhibitor coating, of sufficient thickness to provide substantial heat insulation, bonded thereto, said coating consisting essentially of an epoxy polymer containing, as an integral portion thereof, at least one layer of a porous sheet consisting essentially of an organic polymer material, said organic polymer material being selected from the group consisting of polyamide, polyacrylonitrile, polyacrylate ester, polymethacrylate ester, polyester, polyethylene, cellulose ester, cellulose ether, polyvinyl, cotton, and rayon, said inhibitor coating being bonded circumferentially at its forward end to a rearwardly projecting extension, concentric therewith, of the front wall closure of said combustion chamber.

16. The rocket motor of claim 15 in which the inhibitor coating consists essentially of a cured mixture of a reactive liquid aryl epoxy polymer and a liquid polyamide containing reactive amino groups and the porous sheet is in the form of a woven fabric.

17. The rocket motor of claim 16 in which the aryl epoxy polymer is the reaction product of bisphenol A and epichlorohydrin; and the woven fabric is a polyamide.

18. A shaped solid propellent grain comprising a self-oxidant gas-producing composition having at least one initial ignition surface, and having at least one surface inhibited against ignition by a solid inhibitor coating, of sufficent thickness to provide substantial heat insulation, bonded thereto, said coating consisting essentially of an epoxy polymer containing embedded therein, as an ingral portion thereof, at least one layer of a porous sheet consisting essentially of an organic polymer material, said organic polymer material being selected from the group consisting of polyamide, polyacrylonitrile, polyacrylate ester, polymethacrylate ester, polyester, polyethylene, cellulose ester, cellulose ether, polyvinyl, cotton and rayon.

References Cited in the file of this patent

UNITED STATES PATENTS

| 2,479,828 | Geckler | Aug. 23, 1949 |
| 2,917,424 | Hirsch et al. | Dec. 15, 1959 |

OTHER REFERENCES

Dougherty: "Chem. Eng. Progress," vol. 53, No. 10, October 1957, pages 489–492.

Zaehringer et al.: "Missiles and Rockets," vol. 3, No. 3, March 1958, page 69.

Zaehringer: "Solid Propellant Rockets, Second Stage," American Rocket Co., Box 1112, Wyandotte, Mich., 1958, pp. 211–219.